Patented Apr. 27, 1948

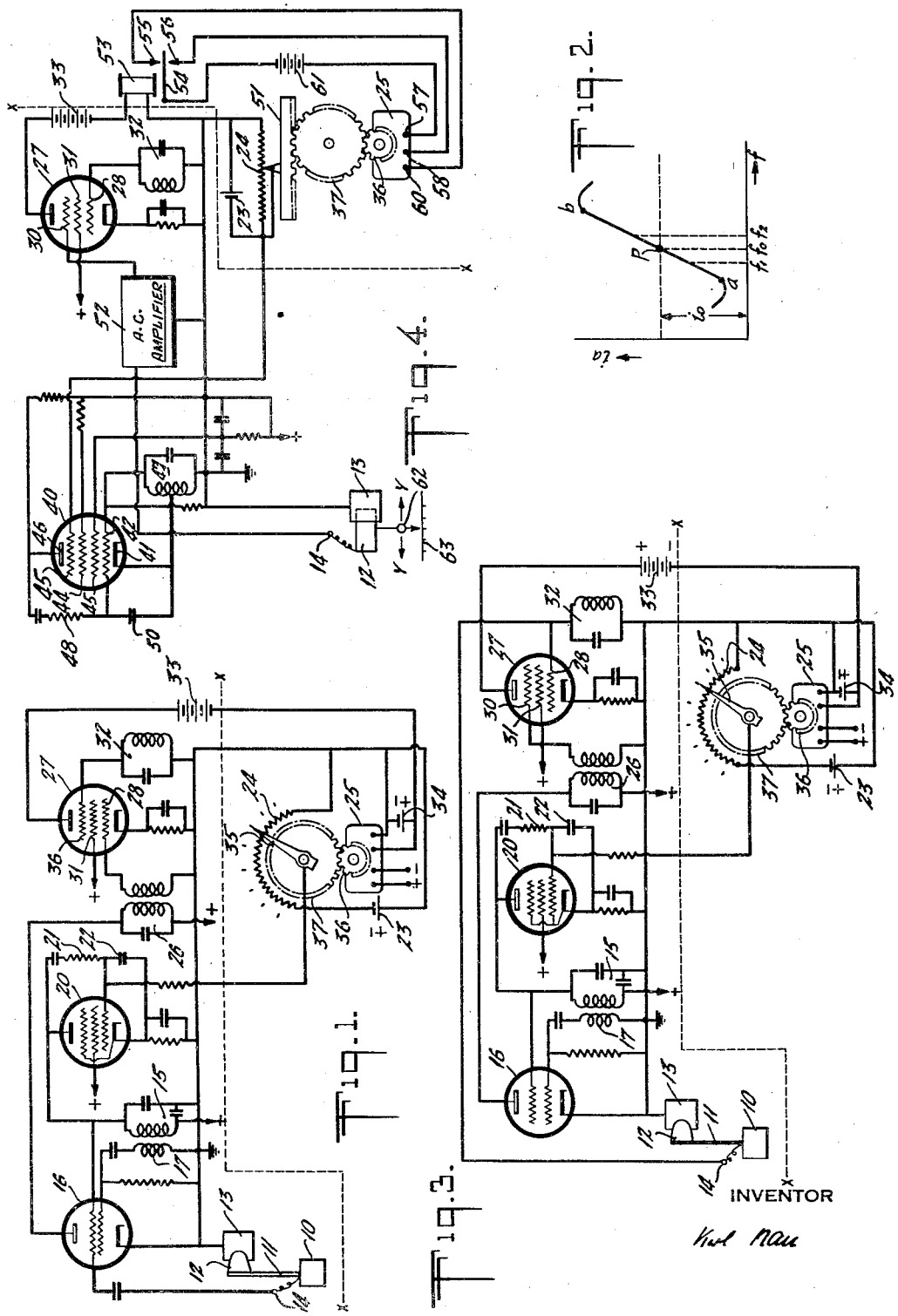

2,440,486

UNITED STATES PATENT OFFICE 2,440,486

VARIABLE FREQUENCY CONTINUOUS BALANCE MOTOR CONTROL SYSTEM

Karl Rath, New York, N. Y., assignor to Radio Patents Corporation, New York, N. Y., a corporation of New York Original application February 19, 1944, Serial No. 523,027. Divided and this application June 26, 1947, Serial 757,198

8 Claims. (Cl. 318—28)

This application is a division of application Serial No. 523,027, filed February 19, 1944, now Patent Number 2,423,617, issued July 8, 1947, entitled Continuous balance motor control system.

The present invention relates to continuous balance motor control or translating systems also known as follow-up devices or torque amplifiers for operating an indicator, recorder or control mechanism in accordance with relatively small changes or variations of an input magnitude or condition.

Known arrangements of this type comprise essentially a balanced electrical network adapted to become unbalanced by an initial deflection or displacement of a leader element such as a sensitive galvanometer to produce an off-balance output current which serves to control an electric motor operating in turn an indicator, recorder or control device. The motor at the same time produces a varying compensating voltage for balancing or neutralizing the galvanometer exciting voltage in such a manner as to restore and maintain the balance of the system. As a result of this self-balancing action, the displacement of the output device follows the variations of the input magnitude continuously and substantially without the effect of intermediary translating elements such as amplifiers, etc., on the linearity or fidelity of the input-output characteristic of the system.

An object of the present invention is to provide a system of this type which, while requiring a minimum of parts and elements both electrical and mechanical, insures high operating stability and extreme sensitivity to slight variations of an input magnitude.

Another object is to provide a translation system of this character capable of operating a comparatively high power electrical motor controlling an output device or mechanism in response to the displacement or variations of a relatively simple pilot or leader element controlled either manually or in accordance with varying electric input energy, temperature, pressure, load or changes of any other variable magnitude or condition to be translated.

With the above and further objects in view, the invention involves essentially the provision of a frequency balancing arrangement in addition to other features of improvement in connection with a follow-up or torque amplifier arrangement of the general type referred to above.

The above and further objects and novel aspects of the invention will become more apparent from the following detailed description taken in reference to the accompanying drawing forming part of this specification and wherein:

Figure 1 is a schematic circuit diagram of a continuous balance motor control or torque amplifier system embodying the principles of the invention;

Figure 2 is a graph explanatory of the function and operation of Figure 1; and

Figures 3 and 4 are diagrams illustrating modifications of self-balancing motor control systems constructed in accordance with the invention.

Like reference characters identify like parts in different views of the drawing.

Referring to Figure 1, there is shown schematically a primary or leader element 10 which may be a sensitive galvanometer or any other type of indicating instrument responsive to any variable magnitude and provided with a pointer 11 to which is attached a metal vane 12 serving as one electrode of a variable condenser. The electrode 12 cooperates with a fixed electrode 13, whereby the capacity between said electrodes varies in proportion to the deflection of the pointer 11. In order to effect electrical connection to the electrode 12 by way of the pointer 11, the latter is shown connected to a fixed terminal 14 through a flexible conductor, in the manner indicated in the drawing. The variable condenser formed by the elements 12 and 13 is effectively connected to the oscillating tank circuit 15 of a high frequency oscillator or generator in such a manner as to control the oscillating frequency in proportion to a deflection or displacement of the element 12 from a normal or initial position. Thus, assuming the oscillator to generate a given frequency, a deflection of the electrode 12 in one sense will result in an increase and a deflection of said electrode in the opposite sense will result in a decrease of the capacity of the condenser 12, 13, whereby to cause a corresponding decrease or increase, respectively, of the oscillating frequency from a normal or initial frequency, as is readily understood.

The oscillator, in the example shown, is of the electron coupled type with the tank circuit 15 being connected between the screen grid and cathode of a tetrode 16 and reactively coupled with the control grid through a feed-back or tickler coil 17 in such a manner as to generate sustained electrical oscillations. Oscillation energy is derived from the anode circuit of the tube by means of a further tuned circuit 26 serving for coupling the oscillator with a load circuit in a manner well known. As is understood, any other known type of oscillator may be provided for the purpose of the invention. Furthermore, the condenser 12, 13 may be replaced by any other suitable control device providing a variable input reactance connected to the tank circuit 15 for controlling the oscillating frequency.

The oscillating frequency generated in the tank circuit 15 is additionally controlled by means of an electronic reactance tube 20 effectively shunted across said circuit and excited by a quadrature potential derived from the circuit through a phase-shifting network comprising a resistance 21 in series with a condenser 22. Accordingly, a variable virtual reactance controlling the oscillating frequency will be reflected upon the tank circuit 15, the magnitude of said reactance depending upon the internal impedance of the tube 20 which is controlled by a suitable bias potential applied to the input control grid thereof. This bias potential, in accordance with the invention, is supplied from a source such as a battery 23 in conjunction with an adjustable potentiometer resistance 24 having a movable contact arm 35 controlled by a direct current motor 25 through transmission gears 36 and 37.

The oscillations generated in the tank circuit 15 are applied by way of the tuned coupling circuit 26 to a frequency discriminator of special type to convert the varying frequency into proportionate output current changes suitable for energizing the field winding of the motor 25.

The frequency discriminator shown in the drawing is of the so-called phase-shift type and comprises essentially a resonant impedance means having a fixed natural frequency equal to the normal oscillating frequency produced by the generator 16. Such a discriminator has an operating characteristc representing its output current $i_a$ as a function of the input frequency $f$, as shown in Figure 2. The characteristic has a straight line portion $a$—$b$ of substantially linear output current change in proportion to a varying input frequency. By properly choosing the operating point P upon the characteristic to coincide with the normal or initial oscillating frequency $f_0$, relatively large off-balance discriminator output currents may be obtained in response to slight oscillator frequency variations in either direction from the frequency $f_0$, as indicated at $f_1$ and $f_2$ in the drawing.

The steepness of the characteristic $a$—$b$, i. e., the sensitivity of the discriminator to initial oscillating frequency deviations from the normal frequency $f_0$ may be increased to almost any desired degree by using a resonant impedance in the discriminator having a high "Q," such as a low-loss resonant circuit, piezoelectric crystal or the like. The fact that the increased steepness of the characteristic curve $a$—$b$ or sensitivity of the discriminator entails a corresponding reduction of the frequency deviation range corresponding to the straight-line portion of the curve, which property of a discriminator of this type has made it necessary in the past to utilize a relatively low sensitivity in order to accommodate given input frequency ranges, as in the case of a frequency modulated radio receiver, is of no consequence as far as the present invention is concerned. This is due to the fact that, in a continuously balanced or follow-up system the oscillation and discriminator frequencies are constantly balanced upon the operating point P of the characteristic and that only slight or minute deviations occur from this balance position, which are instantly neutralized by the off-balance current, whereby to enable the use of extreme discriminator sensitivities by increasing the "Q" of the resonant circuit or equivalent impedance means of the discriminator circuit.

More specifically, the discriminator shown in Figure 1 is a known electronic or space-charge type discriminator, comprising a vacuum tube 27 including a pair of control grids 28 and 36 separated by a screen grid 31 to produce a concentrated space-charge or virtual cathode near said grids, in a manner well known. The oscillator output voltage derived from the circuit 26 is applied to one of the control grids of the discriminator 27, in the example shown, to the inner grid 28, while the outer control grid 36 is connected to the cathode through a resonant impedance in the form of a parallel tuned circuit 32 resonant to the frequency $f_0$ in the manner pointed out above.

In a discriminator of this type, the plate current $i_a$ supplied by a suitable high voltage source such as a battery 33 varies substantially as shown in Figure 2 as a function of the frequency $f$ of the applied oscillating voltage. If the frequency of the applied voltage equals the resonant frequency $f_0$ of the circuit 32, which may be replaced by a piezoelectric crystal shunted by a high impedance pervious to direct current, the plate current of the tube 27 will have a normal or quiescent value $i_0$ which will be increased or decreased in response to a frequency departure of the oscillating frequency from the frequency $f_0$, in the manner shown by the diagram of Figure 2.

The output current of the discriminator is utilized to energize the field winding of the motor 25, the steady or quiescent component $i_0$ being balanced by means of a neutralizing battery 34 or an equivalent balancing source connected across the motor field terminals. The armature winding of the motor 25 is energized by a separate direct current source, as is readily understood.

Instead of controlling the oscillator frequency by the leader or pilot element 12 as shown in Figure 1, the oscillating frequency may be maintained at a constant value $f_0$ and the variable condenser 12, 13 arranged to control the frequency of the discriminator circuit 32 in the manner shown in Figure 3, which otherwise is substantially similar to Figure 1. The only result in the latter case will be a phase reversal of the variations of the discriminator output current $i_a$ or change of the slope of the curve $a$—$b$ from positive to negative. This change of the output current phase may be considered by the proper connection of any of the circuit elements such as the compensating battery 23, to result in a compensation of an initial frequency variation caused by the displacement of the electrode 12 by a corresponding change of bias of the reactance tube 20. The modification according to Figure 3 has the advantage that the oscillating frequency may be maintained at a highly constant value by the use of a stabilized oscillator comprising a piezoelectric crystal or other means for stabilizing the oscillating frequency, thus resulting in an increased overall stability and increased sensitivity of the self-balancing action of the system.

In an arrangement as described above, any frequency unbalance due to an initial variation of the input capacity as a result of a displacement of the element 12 will be instantly counteracted and compensated by the bias control of the reactance tube 20 caused by the rotation of the motor 25 in one or the other direction, provided a proper choice and design of the circuit constants and proper polarity adjustment of the various elements and circuits of the system has been made. This method of electrically maintaining a frequency balance has the advantage over mechanically balanced arrangements that the motor 25 and associate control device and potentiometer may be located at a place remote from the leader element 12 as indicated by the dashed line x—x in the drawing, whereby the connecting lines or circuits have to transmit only direct current energy and the problem of high frequency transmission over long distances is substantially avoided. Accordingly, the arrangement proposed by the invention is especially suited for telemetering or remote control purposes, as is understood.

Referring to Figure 4, there is shown a system similar to the arrangement shown in Figures 1 and 3, and utilizing a composite oscillator and reactance control tube and other features to improve the operation of the system. The combined oscillator and reactance tube 40 comprises a cathode 41, a first control grid 42, a first screen grid 45, a second screen grid 44, a second control grid 45 and an anode or plate 46, all arranged substantially in the order named. The inner control grid 42 near the cathode and the screen grid 45 are connected to a suitable self-oscillating circuit 47 to generate the operating frequency controlled by the adjustment of the input condenser 12, 13 in substantially the same manner as in the preceding modifications. A portion of the oscillating plate current is fed back upon the grid 42 through a quadrature phase-shifting network comprising a resistance 48 and a condenser 50 in series and connected between the cathode 41 and plate 46 of the tube.

Accordingly, the feed-back potential upon the grid 42 will be phase-shifted by 90° with respect to the oscillating potential in such a manner as to result in a virtual reactance being reflected upon the tank circuit 47. The magnitude of this reactance determining the oscillating frequency is controlled by adjusting the electron space current flowing to the plate 46 by means of a suitable bias potential applied to the second or outer control grid 45. This bias potential is again supplied by a battery 23 and adjustable potentiometer resistance 24, the latter being in turn controlled by an output member 51 shown in the form of a rack cooperating with the gear 37 driven by the motor 35 through gear 36. There is furthermore shown in Figure 4 an alternating current amplifier 52 connected between the oscillator output and the discriminator 27, to produce an output current of sufficient amplitude for operating a polarized relay 53 inserted in the plate circuit of the discriminator. This relay serves to control a special operating source 51 for the motor 35 in place of the direct energization of the motor by the discriminator output current, as shown in Figures 1 and 3.

More specifically, the output current of the discriminator energizes the relay 53 which has an armature 54 and a pair of opposite contacts 55 and 56. The motor 25 is of the special type having a first terminal 57 and a pair of cooperating terminals 58 and 60 connected to separate forward and reverse windings for causing rotation in opposite directions. Terminal 57 is connected to one pole of the source 61 while each of the direct and reverse terminals 58 and 60 are connected to the opposite pole of the source by way of the relay contacts 55 and 56 and the armature 54 in such a manner as to initiate rotation of the motor in either direction depending on which of the contacts 55 and 56 is closed by the armature 54 as a result of an increase or decrease of the discriminator output current $i_a$ above or below the normal or steady current $i_0$, as shown in Figure 2. The input electrode or leader element 12 forming a variable condenser together with the fixed electrode 13 is shown to be controlled manually as indicated by the arrows y—y, by means of a pilot element 62 which may cooperate with a scale 63.

In place of a direct current reversible motor, an alternating current motor may be employed in which case relay 53 serves to reverse the phase of the motor operating voltage to control the direction of rotation in a manner well understood. Furthermore, an additional direct current amplifier may be used to increase the discriminator output current sufficiently for directly energizing a direct current motor or for operating a relay which in turn controls either a direct current or alternating current reversible motor, as will be readily understood from the foregoing.

While there have been shown and described a few desirable embodiments of the invention, it is understood that this description is for the purpose of illustration and that various changes in the proportion and arrangement of parts and circuit elements as well as substitution of equivalent elements and circuits for those herein shown and described, may be made without departing from the spirit and scope of the invention as defined in the appended claims. In other words, the invention applies to all kinds of translating and relaying systems, where a change in a measured condition, such as temperature, pressure, flow or level is to be translated into a change of position or a change of energy, in order to control an operative mechanism which may indicate, record, control or otherwise do useful work. The specification and drawing are accordingly to be regarded in an illustrative rather than in a restrictive sense.

I claim:

1. In a system of the character described, a primary element having a movable member; a secondary element having a movable member; an electric motor driving said secondary element; a frequency converter comprising a first resonant impedance means, a generator of high frequency voltage including a second resonant impedance means having a resonant frequency determinative of the generated frequency and being normally equal to the resonant frequency of said first impedance means, reactive coupling means between said first resonant impedance means and said generator to develop a secondary high frequency voltage by said first resonant impedance means having a phase normally at 90° with respect to the phase of the generated voltage and varying in sense and magnitude in accordance with the relative frequency departure between the generated voltage and the resonant frequency of said first impedance means, and further means for combining said secondary voltage with the generated voltage to produce a direct output current having an amplitude varying in sense and magnitude in accordance with said frequency departure; means for controlling said motor in response to said output current to cause rotation thereof in either direction in dependance upon the sense of variation of said output current; an electronic reactance control tube operatively connected to said generator; means associated with said primary element for varying the resonant frequency of one of said impedance means; a source of constant direct current potential; an adjustable resistance controlled by said motor and connected to said source for producing a variable control potential; and means for applying said control potential to said reactance tube to vary the internal impedance of said tube, whereby to counteract an initial relative frequency departure between said first and second impedance means to maintain said primary and secondary elements in a continuously balanced follow-up movement.

2. In a system of the character described, a primary element having a movable member; a secondary element having a movable member; an electric motor driving said secondary element; a frequency converter comprising a first resonant impedance means, a generator of high frequency voltage including a second resonant impedance means having a resonant frequency determinative of the generated frequency and being normally equal to the resonant frequency of said first impedance means, reactive coupling means between said first resonant impedance means and said generator to develop a secondary high frequency voltage by said first resonant impedance means having a phase normally at 90° with respect to the phase of the generated voltage and varying in sense and magnitude in accordance with the relative frequency departure between the generated voltage and the resonant frequency of said first impedance means, and further means for combining said secondary voltage with the generated voltage to produce a direct output current having an amplitude varying in sense and magnitude in accordance with said frequency departure; means for controlling said motor in response to said output current to cause rotation thereof in either direction in dependance upon the sense of variation of said output current; an electronic reactance control tube operatively connected to said generator; means associated with said primary element for varying the resonant frequency of said first impedance means; a source of constant direct current potential; an adjustable resistance controlled by said motor and connected to said source for producing a variable control potential; and means for applying said control potential to said reactance tube to vary the internal impedance of said tube, whereby to counteract an initial relative frequency departure between said first and second impedance means and to maintain said primary and secondary elements in a continuously balanced follow-up movement.

3. In a system of the character described, a primary element having a movable member; a secondary element having a movable member; an electric motor driving said secondary element; a frequency converter comprising a first resonant impedance means, a generator of high frequency voltage including a second resonant impedance means having a resonant frequency determinative of the generated frequency and being normally equal to the resonant frequency of said first impedance means, reactive coupling means between said first resonant impedance means and said generator to develop a secondary high frequency voltage by said first resonant impedance means having a phase normally at 90° with respect to the phase of the generated voltage and varying in sense and magnitude in accordance with the relative frequency departure between the generated voltage and the resonant frequency of said first impedance means, and further means for combining said secondary voltage with the generated voltage to produce a direct output current having an amplitude varying in sense and magnitude in accordance with said frequency departure; means for controlling said motor in response to said output current to cause rotation thereof in either direction in dependance upon the sense of variation of said output current; an electronic reactance control tube operatively connected to said generator; a variable condenser element comprising an adjustable electrode controlled by said primary element and a fixed electrode cooperating therewith; means for connecting said variable condenser to form an effective tuning element of said second resonant impedance means for varying the generated frequency in proportion to an initial displacement of said primary element; a source of constant direct current potential; an adjustable resistance controlled by said motor and connected to said source for producing a variable control potential; and means for applying said control potential to said reactance tube to vary the internal impedance of said tube, whereby to counteract an initial frequency departure between said first and second impedance means and to maintain said primary and secondary elements in a continuously balanced follow-up movement.

4. In a system of the character described, a primary element having a movable member; a secondary element having a movable member; an electric motor driving said secondary element; a frequency converter comprising a first resonant impedance means, a generator of high frequency voltage including a second resonant impedance means having a resonant frequency determinative of the generated frequency and being normally equal to the resonant frequency of said first resonant impedance means, reactive coupling means between said first resonant impedance means and said generator to develop a secondary high frequency voltage by said first resonant impedance means having a phase normally at 90° with respect to the phase of the generated voltage and varying in sense and magnitude in accordance with the relative frequency departure between the generated voltage and the resonant frequency of said first impedance means, and further means for combining said secondary voltage with the generated voltage to produce a direct output current having an amplitude varying in sense and magnitude in accordance with said frequency departure; means for controlling said motor in response to said output current to cause rotation thereof in either direction in dependence upon the sense of variation of said output current; an electronic reactance control tube operatively connected to said generator; a variable condenser element comprising an adjustable electrode controlled by said primary element and a fixed electrode cooperating therewith, said variable condenser element connected to form an effective tuning element of said first resonant impedance means for producing a frequency departure between the resonant frequency thereof and the generated frequency in response to an initial displacement of said primary element; a source of constant direct current potential; an adjustable resistance controlled by said motor and connected to said source for producing a variable control potential; and means for applying said control potential to said reactance tube to vary the internal impedance of said tube, whereby to counteract an initial frequency departure between said first and second impedance means and to maintain said primary and secondary elements in a continuously balanced followup movement.

5. In a system of the character described, a primary element having a movable member; a secondary element having a movable member; a motor driving said secondary element; a frequency converter comprising an electronic tube having at least a cathode, an anode, a pair of control grids and a screen grid interposed between said control grids, a first resonant impedance means connected between said cathode and one of said control grids, a generator of high frequency voltage including a second resonant impedance means having a resonant frequency determinative of the generated frequency and connected between the other of said control grids and said cathode, for producing an anode current having an implitude varying in sense and magnitude in accordance with the relative frequency departure between the generated frequency and the resonant frequency of said first impedance means; means for controlling said motor in response to said anode current to cause rotation thereof in either direction in dependance upon the sense of variation of said anode current; an electric reactance control tube operatively connected to said generator; means associated with said primary element for varying the resonant frequency of one of said impedance means; a source of constant direct current potential; an adjustable resistance controlled by said motor and connected to said source for producing a variable control potential; and means for applying said control potential to said reactance tube to vary the impedance of said tube, to thereby maintain a frequency balance between said first and second impedance means and to cause said secondary element substantially instantly and continuously to follow the movement of said primary element.

6. In a system of the character described, a primary element having a movable member; a secondary element having a movable member; a motor driving said secondary element; a frequency converter comprising an electronic tube having at least a cathode, an anode, a pair of control grids and a screen grid interposed between said control grids, a first resonant impedance means connected between said cathode and one of said control grids, a generator of high frequency voltage including a second resonant impedance means having a resonant frequency determinative of the generated frequency and connected between the other of said control grids and said cathode, for producing an anode current having an amplitude varying in sense and magnitude in accordance with the relative frequency departure between the generated frequency and the resonant frequency of said first impedance means; means for controlling said motor in response to said anode current to cause rotation thereof in either direction in dependance upon the sense of variation of said anode current; an electric reactance control tube operatively connected to said generator; means associated with said primary element for varying the resonant frequency of said first impedance means; a source of constant direct current potential; an adjustable resistance controlled by said motor and connected to said source for producing a variable control potential; and means for applying said control potential to said reactance tube to vary the impedance of said tube, to maintain a frequency balance between said first and second impedance means and to cause said secondary element substantially instantly and continuously to follow the movement of said primary element.

7. In a system of the character described, a primary element having a movable member; a secondary element having a movable member; a motor driving said secondary element; a frequency converter comprising an electronic tube having at least a cathode, an anode, a pair of control grids and a screen grid interposed between said control grids, a first resonant impedance means connected between said cathode and one of said control grids, a generator of high frequency voltage including a second resonant impedance means having a resonant frequency determinative of the generated frequency and connected between the other of said control grids and said cathode, for producing an anode current having an amplitude varying in sense and magnitude in accordance with the relative frequency departure between the generated frequency and the resonant frequency of said first impedance means; means for controlling said motor in response to said anode current to cause rotation thereof in either direction in dependance upon the sense of variation of said anode current; an electric reactance control tube operatively connected to said generator; a variable condenser element having an adjustable electrode controlled by said primary element and a stationary electrode cooperating therewith; means connecting said variable condenser to form an effective tuning element of said second resonant impedance means for varying the generated frequency in proportion to an initial displacement of said primary element; a source of constant direct current potential; an adjustable resistance controlled by said motor and connected to said source for producing a variable control potential; and means for applying said control potential to said reactance tube to vary the impedance of said tube, to maintain a frequency balance between said first and second impedance means and to cause said secondary element substantially instantly and continuously to follow the movement of said primary element.

8. In a system of the character described, a primary element having a movable member; a secondary element having a movable member; a motor driving said secondary element; a frequency converter comprising an electronic tube having at least a cathode, an anode, a pair of control grids and a screen grid interposed between said control grids, a first resonant impedance means connected between said cathode and one of said control grids, a generator of high frequency voltage including a second resonant impedance means having a resonant frequency determinative of the generated frequency and connected between the other of said control grids and said cathode, for producing an anode current having an amplitude varying in sense and magnitude in accordance with the relative frequency departure between the generated frequency and the resonant frequency of said first impedance means; means for controlling said motor in response to said anode current to cause rotation thereof in either direction in dependance upon the sense of variation of said anode current; an electric reactance control tube operatively connected to said generator; a variable condenser element comprising an adjustable electrode controlled by said primary element and a stationary electrode cooperating therewith, said variable condenser arranged to form an effective tuning element of said first resonant impedance means for producing a relative frequency departure between the generated frequency and the resonant frequency of said first impedance means in response to an initial displacement of said primary element; a source of constant direct current potential; an adjustable resistance controlled by said motor and connected to said source for producing a variable control potential; and means for applying said control potential to said reactance tube to vary the impedance of said tube, to maintain a frequency balance between said first and second impedance means and to cause said secondary element substantially instantly and continuously to follow the movement of said primary element.

KARL RATH.